US012706649B2

(12) United States Patent
Chen et al.

(10) Patent No.: US 12,706,649 B2
(45) Date of Patent: Aug. 11, 2026

(54) INFORMATION FEEDBACK METHODS AND APPARATUSES, USER EQUIPMENT, BASE STATION, SYSTEM MODEL AND STORAGE MEDIUM

(71) Applicant: BEIJING XIAOMI MOBILE SOFTWARE CO., LTD., Beijing (CN)

(72) Inventors: Dong Chen, Beijing (CN); Liangang Chi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 251 days.

(21) Appl. No.: 18/567,355

(22) PCT Filed: Jun. 7, 2021

(86) PCT No.: PCT/CN2021/098711

§ 371 (c)(1),
(2) Date: Dec. 5, 2023

(87) PCT Pub. No.: WO2022/256988

PCT Pub. Date: Dec. 15, 2022

(65) Prior Publication Data

US 2024/0275456 A1 Aug. 15, 2024

(51) Int. Cl.
*H04L 41/16* (2022.01)
*H04B 7/0456* (2017.01)
*H04B 7/06* (2006.01)

(52) U.S. Cl.
CPC ......... *H04B 7/0626* (2013.01); *H04B 7/0478* (2013.01); *H04B 7/0634* (2013.01)

(58) Field of Classification Search
CPC .. H04B 7/0626; H04B 7/0478; H04B 7/0658; H04B 7/0634; H04B 7/0639; H04B 7/0417; H04L 1/0026; H04L 1/0028; H04L 1/1614
See application file for complete search history.

(56) References Cited

U.S. PATENT DOCUMENTS 8,462,646 B2 * 6/2013 Barberis ............. H04B 17/345 370/252
2015/0256244 A1 9/2015 Yu et al.
2016/0365913 A1 * 12/2016 Lau ...................... H04L 1/0029

(Continued)

FOREIGN PATENT DOCUMENTS

AU 2018237990 A1 10/2019
CN 105981320 A 9/2016

(Continued)

OTHER PUBLICATIONS

Supplementary European Search Report of EP21944499.9 dated Mar. 17, 2025, (12p).

(Continued)

*Primary Examiner* — Anez C Ebrahim
(74) *Attorney, Agent, or Firm* — Arch & Lake LLP; Hao Tan; Shen Wang

(57) ABSTRACT

An information feedback method includes: obtaining a channel state information (CSI) matrix; screening, based on self-information of the CSI matrix, elements in the CSI matrix to obtain a sparse CSI matrix; and determining, based on the elements in the sparse CSI matrix, feedback information and sending the feedback information to a base station.

18 Claims, 5 Drawing Sheets

Obtain a channel state information (CSI) matrix — 101

Screen, based on self-information of the CSI matrix, elements in the CSI matrix to obtain a sparse CSI matrix — 102

Determine, based on the elements in the sparse CSI matrix, feedback information and send the feedback information to a base station — 103

(56) References Cited

U.S. PATENT DOCUMENTS

| | | | | |
|---|---|---|---|---|
| 2018/0076871 | A1* | 3/2018 | Rahman | H04B 7/0634 |
| 2020/0067573 | A1 | 2/2020 | Kuchi | |
| 2020/0130999 | A1* | 4/2020 | Sun | B66B 5/0062 |
| 2020/0343960 | A1* | 10/2020 | Li | H04L 1/0026 |
| 2021/0126692 | A1 | 4/2021 | Chung et al. | |

FOREIGN PATENT DOCUMENTS

| | | |
|---|---|---|
| CN | 106972877 A | 7/2017 |
| CN | 111464220 A | 7/2020 |

OTHER PUBLICATIONS

Sun et al. "AnciNet: An Efficient Deep Learning Approach for Feedback Compression of Estimated CSI in Massive MIMO Systems", arXiv:2008.07112v1 [eess.SP], Aug. 17, 2020, (13p).

ISA State Intellectual Property Office of the People's Republic of China, International Search Report Issued in Application No. PCT/CN2021/098711, Mar. 3, 2022, WIPO, (3p).

Rao, X., et al., "Distributed compressive CSIT estimation and feedback for FDD multi-user massive MIMO systems," IEEE Trans. Signal Process., vol. 62, No. 12, pp. 3261-3271, Jun. 2014, (16p).

Shen, W. et al., "Channel feedback based on AoD-adaptive subspace codebook in FDD massive MIMO systems," IEEE Trans. Commun., vol. 66, No. 11, pp. 5235-5248, Nov. 2018, (30p).

Kuo, P. et al., "Compressive sensing based channel feedback protocols for spatially-correlated massive antenna arrays," in Proc. IEEE Wireless Commun. Netw.Conf. (WCNC), Paris, France, Apr. 2012, pp. 492-497, (6p).

Lu, C. et al., "MIMO channel information feedback using deep recurrent network," IEEE Commun. Lett., vol. 23, No. 1, pp. 188-191, Jan. 2019, (4p).

Lu, C. et al., "Bit-level optimized neural network for multi-antenna channel quantization," IEEE Wireless Commun. Lett., vol. 9, No. 1, pp. 87-90, Jan. 2020, (9p).

Wang, T. et al., "Deep learning-based CSI feedback approach for time-varying massive MIMO channels," IEEE Wireless Commun. Lett., vol. 8, No. 2, pp. 416-419, Apr. 2019, (4p).

Liu, L. et al., "The COST 2100 MIMO channel model," IEEE Wireless Commun., vol. 19, No. 6, pp. 92-99, Dec. 2012, (4p).

Pan, JiYuan et al., Nonnegative Matrix Factorization with Maximum Self-Information on Basis Components 18, 20, 22-24 , IEEE, Dec. 31, 2011, (5p).

Wen, C.K. et al., "Deep learning for massive MIMO CSI feedback," IEEE Wireless Commun. Lett., vol. 7, No. 5, pp. 748-751, Oct. 2018, (4p).

State Intellectual Property Office of the People's Republic of China, Office Action and Search Report Issued in Application No. 2021800017509, Dec. 20, 2025, 30 pages. (Submitted with Machine/Partial Translation).

INOA issued in Application No. 202417000768 dated Apr. 16, 2024 with English translation, (8p).

Qianqian Yang et al., "Deep Convolutional Compression for Massive MIMO CSI Feedback", arXiv:1907.02942v1 [cs. IT], Jul. 2, 2019, (7p).

Timor Kadir et al., "Saliency, Scale and Image Description", International Journal of Computer Vision, vol. 45, No. 2, p. 83-p. 105, Jun. 22, 2001, (23p).

Zhen Gao et al., "Spatially Common Sparsity Based Adaptive Channel Estimation and Feedback for FDD Massive MIMO", IEEE Transactions on Signal Processing, vol. 63, No. 23, p. 6169-p. 6183, Dec. 1, 2015, (15p).

Jiajia Guo et al., "Convolutional Neural Network-Based Multiple-Rate Compressive Sensing for Massive MIMO CSI Feedback: Design, Simulation, and Analysis", IEEE Transactions on Wireless Communications, vol. 19, No. 4, p. 2827-p. 2840, Apr. 2020,(14p).

* cited by examiner

INFORMATION FEEDBACK METHODS AND APPARATUSES, USER EQUIPMENT, BASE STATION, SYSTEM MODEL AND STORAGE MEDIUM

CROSS REFERENCE TO RELATED APPLICATIONS

This application is a National Phase Application of International Application No. PCT/CN2021/098711, filed on Jun. 7, 2021, the entire contents of which are incorporated herein by reference in their entireties.

TECHNICAL FIELD

The present disclosure relates to the field of communication technologies and in particular to information feedback methods and apparatuses, a user equipment, a base station, a system model and a storage medium.

BACKGROUND

Due to good stability, good energy utilization rate and good interference immunity of the massive multiple-input multiple-output (m-MIMO) technology, wireless communication is usually performed using an m-MIMO system. In the m-MIMO system, a user equipment (UE) usually needs to feed a channel state information (CSI) matrix of a downlink back to a base station such that the base station can determine channel quality of the downlink based on the CSI matrix. Since there are many base station-end antennas in the m-MIMO system, there are many downlinks corresponding to the base station end, increasing the overhead of feeding back the CSI matrix. Therefore, it is necessary to seek a low-overhead information feedback method.

SUMMARY

According to a first aspect of embodiments of the present disclosure, there is provided an information feedback method, which is performed by a user equipment (UE). The method includes:

- obtaining a channel state information (CSI) matrix;
- screening, based on self-information of the CSI matrix, elements in the CSI matrix to obtain a sparse CSI matrix; and
- determining, based on the elements in the sparse CSI matrix, feedback information and sending the feedback information to a base station.

According to a second aspect of embodiments of the present disclosure, there is provided an information feedback method, which is performed by a base station. The method includes:

- obtaining feedback information from a user equipment (UE) to determine, based on the feedback information, a preparatory channel state information (CSI) matrix; and
- reconstructing, based on the preparatory CSI matrix, a CSI matrix.

According to a third aspect of embodiments of the present disclosure, there is provided a user equipment, including a transceiver, a memory, and a processor connected to the transceiver and the memory, and configured to execute computer executable instructions stored on the memory to control reception and transmission of a wireless signal of the transceiver, and perform the method of the above first aspect.

According to a fourth aspect of embodiments of the present disclosure, there is provided a base station, including a transceiver; a memory; and a processor connected to the transceiver and the memory, and configured to execute computer executable instructions stored on the memory to control reception and transmission of a wireless signal of the transceiver, and perform the method of the above second aspect.

Additional aspects and advantages of the present disclosure will be given partially from the following descriptions and partially become apparent from the following descriptions or understood from the practice of the present disclosure.

BRIEF DESCRIPTION OF THE DRAWINGS

The above and/or additional aspects and advantages of the present disclosure will become obvious or easily intelligible from the description of the embodiments in combination with the accompanying drawings.

DETAILED DESCRIPTION OF THE EMBODIMENTS

Figures 1, 2:
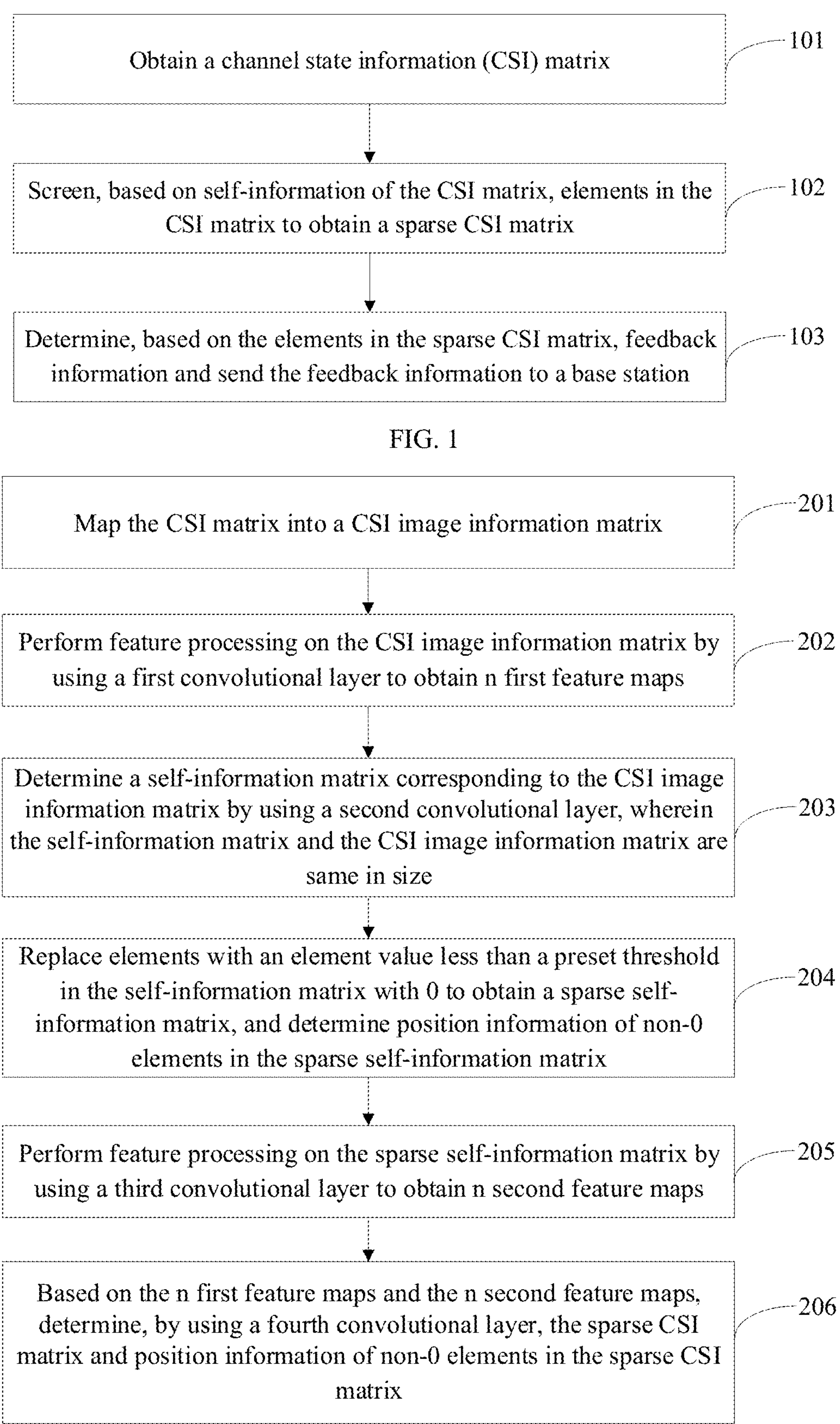
FIG. 1 is a flowchart illustrating an information feedback method according to an embodiment of the present disclosure.
FIG. 2 is a flowchart of obtaining a sparse CSI matrix according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are used for the purpose of describing particular embodiments only, and are not intended to limit the present disclosure. Terms determined by “a”, “the” and “said” in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

The embodiments of the present disclosure will be detailed below. The examples of the present disclosure are illustrated in the drawings, where same or similar numerals represent same or similar elements throughout. The embodiments described by referring to the accompanying drawings are merely illustrative and are intended to interpret the present disclosure and shall not be understood as limiting of the present disclosure.

Detailed descriptions are made below by referring the accompanying drawings about the information feedback methods and apparatuses, the user equipment, the base station, system model and the non-transitory storage medium provided by the embodiments of the present disclosure.

In the related arts, the methods by which the UE feeds back the CSI matrix mainly include the following methods:

In method 1, by using angle-of-departure (AoD) adaptive subspace codebook, the CSI matrix is quantized into a number of bits and fed back to the base station, such that the base station reconstructs the CSI matrix based on the number of bits.

In method 2, the CSI matrix is transformed into a sparse matrix under channel space and the sparse matrix is then subjected to stochastic compressive sampling to obtain a low-dimensional measurement value and feed the value back to the base station, such that the base station reconstructs the CSI matrix based on the low-dimensional measurement value.

In method 3, based on a neural network model of deep learning (DL), the CSI matrix is fed back to the base station.

In the method 1, when there are many bits transformed from the CSI matrix, the overhead will be still large. In the method 2, since stochastic sampling is performed to obtain the low-dimensional measurement value without considering the structural characteristics of the CSI matrix, the obtained low-dimensional measurement value cannot accurately reflect the original CSI matrix and hence, the CSI matrix reconstructed by the base station is greatly different from the original CSI matrix sent by the UE, leading to a low reconstruction accuracy of the base station. In the method 3, due to high complexity and slow convergence at the time of training the neural network model, the reconstruction accuracy of the base station is also low.

The present disclosure provides information feedback methods and apparatuses, a user equipment, a base station, a system model and a non-transitory storage medium, so as to solve the technical problems of low reconstruction accuracy of the base station and large overhead in the existing information feedback methods.

FIG. 1 is a flowchart illustrating an information feedback method according to an embodiment of the present disclosure. The information feedback method is applied to a User Equipment (UE). As shown in FIG. 1, the information feedback method may include the following steps 101 to 103.

At step 101, channel state information (CSI) matrix is obtained.

It is to be noted that, the information feedback method of the embodiments of the present disclosure may be applied to any UE. The UE may be a device directed toward a user to provide voice and/or data connectivity. The UE may communicate with one or more core networks through a radio access network (RAN). The UE may be a terminal of internet of things, such as a sensor device, a mobile phone, (or called cellular phone), and a computer having a terminal of internet of things, such as a fixed, portable, pocket-sized, handheld, or computer-inbuilt or vehicle-mounted apparatus, such as station (STA), subscriber unit, subscriber station, mobile station, mobile, remote station, access point, remote terminal, access terminal, user terminal, or user agent. Alternatively, the UE may also be a device of an unmanned aerial vehicle, or a vehicle-mounted device, for example, may be a trip computer having wireless communication function, or a wireless terminal externally connected to a trip computer. In some embodiments, the UE may be a roadside device, for example, may be a road lamp, signal lamp or other roadside devices having wireless communication function.

It is to be noted that in an embodiment of the present disclosure, the UE end may be provided with a single antenna and the base station end may be provided with multiple antennas. In an embodiment of the present disclosure, the antennas of the base station end may be arranged in uniform linear array (ULA), for example, $N_t$=32 antennas may be disposed in a spacing in half wavelength.

In an embodiment of the present disclosure, obtaining, by the UE, the CSI matrix may include: obtaining, by the UE, a CSI matrix corresponding to each antenna channel of the base station.

In another embodiment of the present disclosure, obtaining, by the UE, the CSI matrix may also include: based on pilot information sent by the base station, determining, by the UE, the original CSI matrix, and then transforming the obtained original CSI matrix from a space frequency domain to an angle delay domain to obtain a CSI matrix of the angle delay domain.

In an embodiment of the present disclosure, the UE may use two-dimensional discrete Fourier transform to transform the original CSI matrix $\tilde{H}$ from the space frequency domain to the angle delay domain, where the CSI matrix of the angle delay domain is $$H = F_d \tilde{H} F_a^H,$$

where $F_d$ and $$F_a^H$$

are discrete Fourier transform matrices corresponding to $\tilde{N}_c \times \tilde{N}_c$ and $N_t \times N_t$, and $\tilde{N}_c$ indicates a number of antennas provided on the base station. For example, in the m-MIMO using orthogonal frequency division multiplexing (OFDM) technology, $\tilde{N}_c$=1024; and $N_t$ indicates a number of subcarriers corresponding to each antenna, for example, $N_t$=32, the superscripted H indicates conjugate transpose of a matrix. Further, in an embodiment of the present disclosure, the size of the CSI matrix H of the angle delay domain may be $d_1 \times N_c \times N_r$, where $d_1$ refers to a number of antenna channels, and $N_c$ refers to a number of antennas provided on the base station. Further, the CSI matrix H of the angle delay domain may include a real part matrix $H_{re}$ and an imaginary part matrix $H_{im}$.

It is to be noted that in an embodiment of the present disclosure, subsequent processing on the CSI matrix of the angle delay domain (for example, subsequent screening, compression quantization, filling and reconstruction and the like) specifically refer to processing performed on the real part matrix $H_{re}$ and the imaginary part matrix $H_{im}$ of the CSI matrix H respectively. In some embodiments, the above solution may include the following step 102.

At step 102, elements in the CSI matrix are screened based on self-information of the CSI matrix to obtain a sparse CSI matrix.

It is to be noted that the step 101 may be performed separately or together with the step 102. That is, any device may perform only the step 101 to obtain the CSI matrix; any device may also perform the steps 101 and 102 to obtain the CSI matrix and based on the CSI matrix, obtain a sparse CSI matrix.

FIG. 2 is a flowchart of obtaining a sparse CSI matrix according to an embodiment of the present disclosure. As shown in FIG. 2, the method may include the following steps 201 to 206.

At step 201, the CSI matrix is mapped into a CSI image information matrix.

In an embodiment of the present disclosure, the CSI matrix may be obtained in any proper way. That is, the CSI matrix may be obtained in the same manner as the step 101 or in any other feasible manner.

In an embodiment of the present disclosure, mapping the CSI matrix into the CSI image information matrix may include: transforming the real part $H_{re}$ of the CSI matrix H into a CSI image information matrix corresponding to the real part $H_{re}$, and transforming the imaginary part $H_{im}$ of the CSI matrix H into a CSI image information matrix corresponding to the imaginary part $H_{im}$.

At step 202, feature processing is performed on the CSI image information matrix by using a first convolutional layer to obtain n first feature maps, wherein n is a integer and $n \geq 1$.

In an embodiment of the present disclosure, the first convolutional layer may be a convolutional layer with gradient update. Illustratively, in an embodiment of the present disclosure, a size of a convolutional kernel of the first convolutional layer may be $n \times c \times s \times s$ and a convolutional stride may be L, where $L < s$, and n, c, s, L are all positive integers. Illustratively, in an embodiment of the present disclosure, the size of a convolutional kernel of the first convolutional layer may be $64 \times 2 \times 3 \times 3$ and the convolutional stride may be 1.

In an embodiment of the present disclosure, the n first feature maps may be n dimensions of feature maps corresponding to the CSI image information matrix. Illustratively, in an embodiment of the present disclosure, when n is equal to 64, it indicates that feature processing is performed on the CSI image information matrix by using the first convolutional layer to obtain 64 dimensions of first feature maps corresponding to the CSI image information matrix.

At step 203, a self-information matrix corresponding to the CSI image information matrix is determined by using a second convolutional layer, where the self-information matrix and the CSI image information matrix are same in size.

Figures 3, 4, 5:
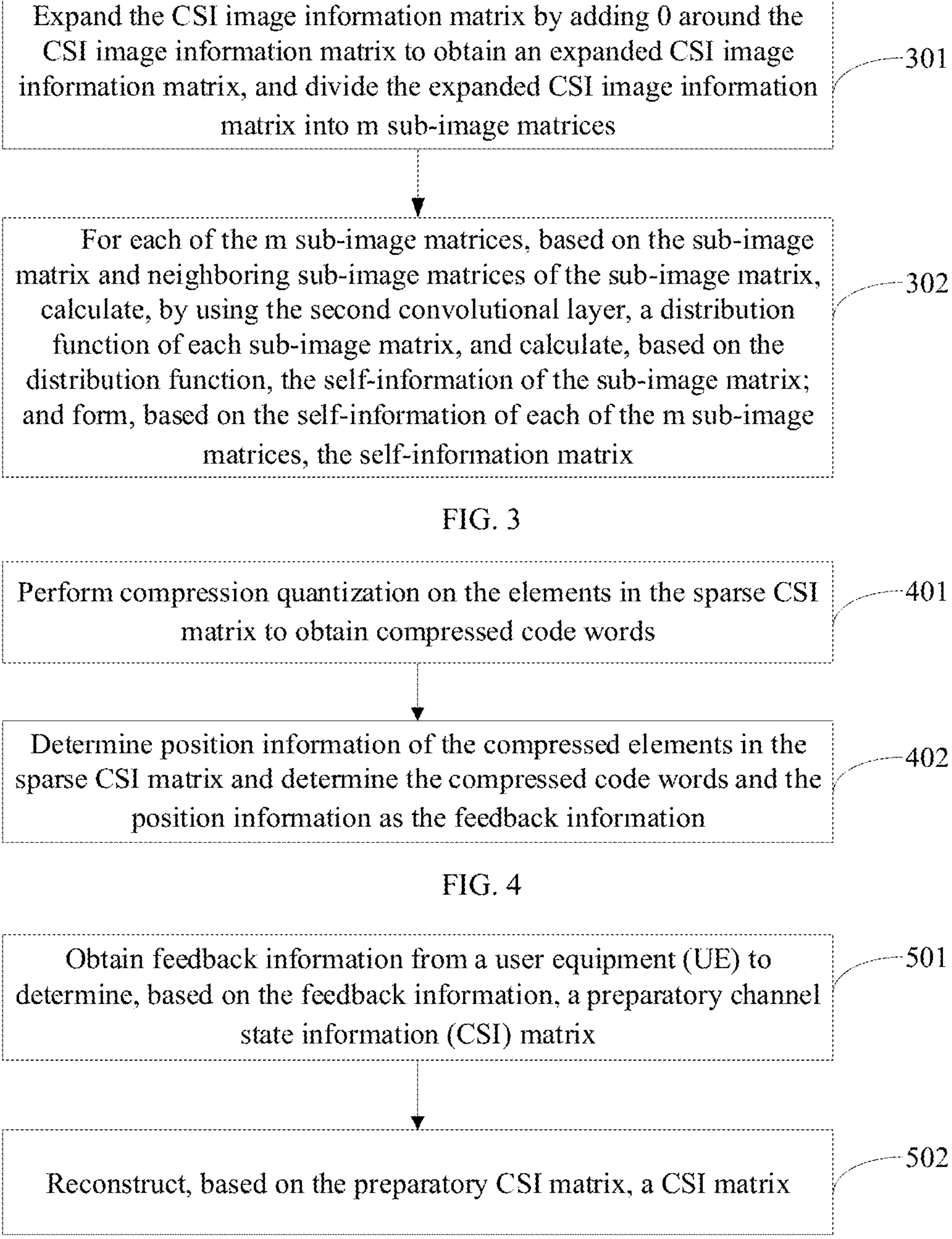
FIG. 3 is a flowchart of determining a self-information matrix corresponding to a CSI image information matrix by using a second convolutional layer according to an embodiment of the present disclosure.
FIG. 4 is a flowchart of determining feedback information according to an embodiment of the present disclosure.
FIG. 5 is a flowchart illustrating an information feedback method according to an embodiment of the present disclosure.

FIG. 3 is a flowchart of determining a self-information matrix corresponding to the CSI image information matrix by using a second convolutional layer according to an embodiment of the present disclosure. As shown in FIG. 3, the method includes the following steps 301 to 302.

At step 301, 0 is added around the CSI image information matrix to expand the CSI image information matrix to obtain an expanded CSI image information matrix, and the expanded CSI image information matrix is then divided into m sub-image matrices; where m is an integer, $m \geq 2$, and m is equal to the number of the elements included in the CSI image information matrix.

In an embodiment of the present disclosure, the CSI image information matrix may be obtained in any proper way; that is, the CSI image information matrix may be obtained in the same manner as the step 201 or in any other feasible manner.

In an embodiment of the present disclosure, a method of dividing the expanded CSI image information matrix into m sub-image matrices may include: dividing the expanded CSI image information matrix by using $x \times s$ grids, where x and s are positive integers, and may be same or different. Illustratively, in an embodiment of the present disclosure, the expanded CSI image information matrix may be divided by using $7 \times 7$ grids.

At step 302, for each of the m sub-image matrices, based on the sub-image matrix and neighboring sub-image matrices of each sub-image matrix, a distribution function of each sub-image matrix is calculated by using the second convolutional layer, and based on the distribution function, the self-information of the sub-image matrix is calculated, and then based on the self-information of the sub-image matrix, the self-information matrix is formed.

In an embodiment of the present disclosure, the second convolutional layer may be a convolutional layer without gradient update.

In an embodiment of the present disclosure, based on each sub-image matrix and the neighboring sub-image matrices of each sub-image matrix, by using the second convolutional layer, calculating the distribution function of each sub-image matrix may include the following steps a to c.

At step a, the i-th sub-image matrix $p_i$ input to the second convolutional layer is selected, where i is an integer and $i \geq 1$.

At step b, neighboring sub-image matrices $p_i$ of the $p_i$ is determined to obtain a neighboring sub-image set $Z_i$ corresponding to the $p_i$.

In an embodiment of the present disclosure, the neighboring sub-image set $Z_i$ may be determined based on neighboring same distribution principle and Manhattan radius R. Specifically, if $p_i$ and its neighboring sub-image matrices $p_i$ come from a same distribution, the neighboring sub-image set $Z_i$ may include $(2R+1)^2$ neighboring sub-image matrices $p_i$ within a circle with the $p_i$ as center and Manhattan radius R as radius.

At step c, based on the formula I, the distribution function $f_i(p_i)$ of the $p_i$ is determined, where the formula I includes:

$$f_i(p_i) = \frac{1}{(2R+1)^2} \sum\nolimits_{p_i' \in Z_i} K(p_i, p_i');$$

where $$K(p_i, p_i') = \frac{1}{\sqrt{2\pi}\,h} \exp\left(-\|p_i - p_i'\|^2/2h^2\right)$$

and h represents a bandwidth between $p_i$ and $p_i'$.

From the above steps a to c, it can be known that in the embodiments of the present disclosure, the distribution function of each sub-image matrix may be calculated based on the sub-image matrix and its neighboring sub-image matrices so as to consider the structural relevance between the sub-image matrices. That is, after the structural relevance between the elements in the CSI image information matrix is considered, when compressed code words are obtained by performing compression quantization on the CSI image information matrix based on the distribution function subsequently, it can be guaranteed that the structural relevance of the CSI matrix will not be destroyed. Thus, when the base station reconstructs a CSI matrix accurately based on the compressed code words subsequently, the reconstruction accuracy can be guaranteed.

Furthermore, in an embodiment of the present disclosure, based on the distribution function, calculating the self-information of each sub-image matrix may include: based on the distribution function $f_i(p_i)$ of the i-th sub-image matrix, by using the formula II, calculating the self-information $I_i(p_i)$ of the i-th sub-image matrix, where the formula II includes:

$$I_i(p_i) = -\log(f_i(p_i)).$$

Therefore, the self-information corresponding to each sub-image matrix can be determined by the above method. Afterwards, the self-information matrix can be formed by using the self-information of each sub-image matrix. In an embodiment of the present disclosure, a method of forming the self-information matrix by using the self-information of each sub-image matrix may include the following steps 1 to 2.

At step 1, establishing one first empty matrix, where the first empty matrix and the CSI image information matrix are same in size.

At step 2, based on a position of each of the m sub-image matrices in the expanded CSI image information matrix, filling the self-information corresponding to each sub-image matrix into the first empty matrix to form the self-information matrix.

It is to be noted that in an embodiment of the present disclosure, the expanded CSI image information matrix is divided into m sub-image matrices in step 301, where m is equal to a number of elements in the CSI image information matrix. Since each sub-image matrix corresponds to one piece of self-information, the number of pieces of self-information determined in step 302 is also equal to the number of elements included in the CSI image information matrix. Based on this, under the precondition that the first empty matrix and the CSI image information matrix are same in size, the number of pieces of self-information is in one-to-one correspondence with the number of empty positions in the first empty matrix. Therefore, based on the position of each sub-image matrix in the expanded CSI image information matrix, the self-information corresponding to each sub-image matrix may be filled one to one into the first empty matrix to form the self-information matrix.

Illustratively, in an embodiment of the present disclosure, based on the position of each sub-image matrix in the expanded CSI image information matrix, filling the self-information corresponding to each sub-image matrix into the first empty matrix may include: if a sub-image matrix is located in the W-th row and the Q-th column of the expanded CSI image information matrix, filling the self-information corresponding to the sub-image matrix into the W-th row and the Q-th column of the first empty matrix.

At step 204, the elements with an element value less than a preset threshold in the self-information matrix are replaced with 0 to obtain a sparse self-information matrix, and position information of non-0 elements in the sparse self-information matrix is determined.

In an embodiment of the present disclosure, the preset threshold may be set in advance.

In an embodiment of the present disclosure, determining the elements with the element value less than the preset threshold in the self-information matrix may include: constructing a decay function $\delta(I_i(p_i))$, a decay coefficient of which is in inverse proportion to the self-information, and based on the decay function, determining elements set to 0 in the self-information matrix.

In an embodiment of the present disclosure, the decay coefficient may obey Boltzmann distribution, and the decay function, for example, may be:

$$\delta(I_i(p_i)) \propto e^{-I_i(p_i)/T};$$

where T may be considered as a soft threshold; when the T value is small, the elements with small element value in the self-information matrix are set to 0; when the T value is approximate to infinity, the elements in the self-information matrix are all set to 0 with equal probability, that is, randomly set to 0.

In an embodiment of the present disclosure, The T value in the decay function should be relatively small.

In an embodiment of the present disclosure, since the decay coefficient and the self-information are in inverse proportion, when the self-information is greater than a preset threshold, a corresponding decay rate is small and the element is retained. When the self-information is not greater than the preset threshold, the corresponding decay rate is large and the element is set to 0. In this way, the sparse self-information matrix is obtained. It should be known that in an embodiment of the present disclosure, the sparse self-information matrix and the CSI image information matrix are same in size.

Therefore, it can be known that in the embodiments of the present disclosure, by replacing with 0 the elements with the element value less than the preset threshold in the self-information matrix, redundant information can be removed from the self-information matrix. Subsequently, when compression quantization is performed on the CSI image information matrix based on the self-information matrix, the compression is more convenient, ensuring the compression efficiency.

Furthermore, in an embodiment of the present disclosure, after the sparser self-information matrix is determined, the position information of the non-0 elements of the sparse self-information matrix in the sparse self-information matrix can also be determined. Thus, the UE may send the position information to the base station subsequently, such that the base station reconstructs a CSI matrix based on the position information, ensuring the accuracy of the reconstructed CSI matrix.

At step 205, feature processing is performed on the sparse self-information matrix by using a third convolutional layer to obtain n second feature maps.

In an embodiment of the present disclosure, the third convolutional layer may be a convolutional layer without gradient update.

In an embodiment of the present disclosure, the n second feature maps may be n dimensions of feature maps corresponding to the self-information matrix. For example, in an embodiment of the present disclosure, n may be equal to 64, namely, by using the third convolutional layer, feature processing is performed on the self-information matrix to obtain 64 dimensions of second feature maps corresponding to the self-information matrix.

It is to be noted that in an embodiment of the present disclosure, the first convolutional layer and the third convolutional layer may be same in structural principle and both can be used to perform feature analysis on an input matrix to obtain n feature maps corresponding to the input matrix.

At step 206, based on the n first feature maps and the n second feature maps, the sparse CSI matrix and position information of non-0 elements of the sparse CSI matrix in the sparse CSI matrix are determined by using a fourth convolutional layer.

In an embodiment of the present disclosure, the fourth convolutional layer may be a convolutional layer with gradient update. Illustratively, in an embodiment of the present disclosure, a size of a convolutional kernel of the fourth convolutional layer may be c×n×s×s and a convolutional stride may be L. Illustratively, in an embodiment of the present disclosure, the size of the convolutional kernel of the fourth convolutional layer may be 2×64×3×3 and the convolutional stride may be 1.

It is to be noted that in an embodiment of the present disclosure, the sparse CSI matrix and the CSI matrix are same in size and dimension.

It can be known from the above contents that in the above steps 201 to 206, the elements in the CSI matrix can be screened based on the self-information of the CSI matrix to obtain the sparse CSI matrix.

In some embodiments, the above solution may also include the following step 103.

At step 103, feedback information is determined based on the elements in the sparse CSI matrix and then fed back to the base station.

FIG. 4 is a flowchart of determining feedback information according to an embodiment of the present disclosure. As shown in FIG. 4, the method may include the following steps 401 to 402.

At step 401, compression quantization is performed on the elements in the sparse CSI matrix to obtain compressed code words.

In an embodiment of the present disclosure, performing compression quantization on the elements in the sparse CSI matrix may include the following steps A to B.

At step A, the element values in the sparse CSI matrix are sorted in a descending order based on self-information.

At step B, the top M element values are selected from the sorted element values for compression quantization to form the compressed code words, where one element value corresponds to one code word.

In an embodiment of the present disclosure, the method of determining M may include the following steps B1 to B2.

At step B1, a compression ratio σ is determined.

In an embodiment of the present disclosure, the compression ratio σ may be determined based on user requirements. For example, in an embodiment of the present disclosure, the compression ratio σ may be determined to be equal to ¼.

At step B2, based on the formula III, the code number M of the compressed code words is calculated, where the formula III includes:

$$\sigma = \frac{a \times M + k \times M}{a \times 2 \times N_c \times N_t};$$

where a indicates a number of bits required for transmitting one code word, k indicates a number of bits required for transmitting the position information of the element corresponding to one code word, $N_c$ indicates a number of antennas provided in the base station, and $N_t$ indicates a number of sub-carriers corresponding to each antenna.

It is to be noted that in an embodiment of the present disclosure, since the feedback information sent by the UE to the base station includes not only the compressed code words but also the position information, the formula III is different from the formula of the compression ratio σ in the related arts. The formula III further includes k indicating a number of bits requires for transmitting the position information of one code word.

Furthermore, in an embodiment of the present disclosure, in step B, the classical Lloyd algorithm may be used to perform compression quantization on the top M element values and 8-bit quantization may be performed on the M element values.

At step C, the position information of each of the top M element value in the sparse CSI matrix is determined the position information of the compressed element values in the sparse CSI matrix.

At step 402, the position information of the compressed elements in the sparse CSI matrix is determined and then the compressed code words and the position information are determined as the feedback information.

In conclusion, in the information feedback method provided by the embodiments of the present disclosure, the UE screens the elements in the CSI matrix to obtain a sparse CSI matrix. Specifically, when determining the sparse CSI matrix, the UE may firstly perform image division on a CSI image information matrix corresponding to the CSI matrix to obtain a plurality of sub-image information matrices, and then, based on each sub-image information matrix and a neighboring sub-image information matrix, determine a distribution function corresponding to each sub-image information matrix, and then based on the distribution function, determine self-information corresponding to each sub-image information matrix, and finally, based on the self-information, screen redundant information to determine the sparse CSI matrix. Furthermore, the UE may determine feedback information based on the elements in the sparse CSI matrix and send the feedback information to the base station, such that the base station reconstructs a CSI matrix based on the feedback information.

It can be known that, in the embodiments of the present disclosure, when the distribution function is determined, structural relevance between each sub-image information matrix and neighboring sub-image information matrices is considered. In this case, when the sparse CSI matrix is determined based on the distribution function subsequently, the structure of the original CSI matrix will not be destroyed and thus, when the base station subsequently determines the feedback information based on the sparse CSI matrix to reconstruct a CSI matrix, the accuracy of the reconstructed CSI matrix can be guaranteed.

Furthermore, since the sparse CSI matrix in the embodiments of the present disclosure is a matrix obtained by deleting redundant information, the convenience of subsequent operation for the sparse CSI matrix is guaranteed, and the overhead is reduced.

Furthermore, in the embodiments of the present disclosure, the feedback information determined by the UE includes the position information of the compressed elements in the sparse CSI matrix. Subsequently, the base station can accurately reconstruct a CSI matrix based on the position information of the compressed elements in the sparse CSI matrix, further ensuring the reconstruction accuracy of the CSI matrix.

FIG. 5 is a flowchart illustrating an information feedback method according to an embodiment of the present disclosure. The method is applied to a base station. As shown in FIG. 5, the information feedback method may include the following steps 501 to 502.

At step 501, feedback information is obtained from a user equipment (UE), and a preparatory channel state information (CSI) matrix is determined based on the feedback information.

In an embodiment of the present disclosure, the feedback information may include: compressed code words obtained by performing compression quantization on elements in a sparse CSI matrix corresponding to the CSI matrix and position information of compressed elements in the sparse CSI matrix.

In an embodiment of the present disclosure, determining the preparatory CSI matrix based on the feedback information may include the following steps (1) to (4).

At step (1), de-quantization is performed on the compressed code words to obtain de-quantized code words.

In an embodiment of the present disclosure, an element value corresponding to each code word can be determined by performing de-quantization on the compressed code words.

At step (2), one second empty matrix is constructed, where the second empty matrix and the CSI matrix are same in size.

At step (3), based on the position information, the de-quantized code words are filled into the second empty matrix.

In an embodiment of the present disclosure, filling the de-quantized code words into the second empty matrix based on the position information may include: if the position information corresponding to a de-quantized code word is the W-th row and the Q-th column, filling the de-quantized code word into the W-th row and the Q-th column of the second empty matrix.

At step (4), average values of the de-quantized code words are calculated and then filled to other positions of the second empty matrix to obtain the preparatory CSI matrix.

Since compression quantization is performed on only the M code words in the sparse CSI matrix in the above step 401, the de-quantized code words also should be only M elements. In an embodiment of the present disclosure, it is possible that the number of the de-quantized code words is less than the number of the positions of the second empty matrix, namely, the de-quantized code words are insufficient to fill up the second empty matrix.

In an embodiment of the present disclosure, the average values of the de-quantized code words may be filled to other positions of the second empty matrix so as to fill up the second empty matrix and thus obtain the preparatory CSI matrix.

At step 502, a CSI matrix is reconstructed based on the preparatory CSI matrix.

In an embodiment of the present disclosure, determining the CSI matrix based on the preparatory CSI matrix may include: inputting the preparatory CSI matrix into a pre-trained convolutional structure to output a reconstructed CSI matrix. It is to be noted that in an embodiment of the present disclosure, the convolutional structure may include a fifth convolutional layer, a sixth convolutional layer, a seventh convolutional layer, an eighth convolutional layer, a ninth convolutional layer, and a tenth convolutional layer which are sequentially connected. In an embodiment of the present disclosure, an output end of the fifth convolutional layer is further connected to an input end of the eighth convolutional layer, and an output end of the eighth convolutional layer is further connected to an input end of the tenth convolutional layer.

Furthermore, in an embodiment of the present disclosure, the convolutional kernel of the fifth convolutional layer is $R_1 \times c \times s \times s$, the convolutional kernel of the sixth convolutional layer is $R_2 \lambda R_1 \times s \times s$, the convolutional kernel of the seventh convolutional layer is $c \times R_2 \times S \times s$, the convolutional kernel of the eighth convolutional layer is $R_1 \times c \times s \times s$, the convolutional kernel of the ninth convolutional layer is $R_2 \times R_1 \times s \times s$, and the convolutional kernel of the tenth convolutional layer is $c \times R_2 \times s \times s$; and the fifth convolutional layer, the sixth convolutional layer, the seventh convolutional layer, the eighth convolutional layer, the ninth convolutional layer, and the tenth convolutional layer all have a same stride.

Illustratively, in an embodiment of the present disclosure, the convolutional kernel of the fourth convolutional layer may be 8×2×3×3, the convolutional kernel of the fifth convolutional layer may be 16×8×3×3, the convolutional kernel of the sixth convolutional layer may be 2×16×3×3, the convolutional kernel of the seventh convolutional layer may be 8×2×3×3, the convolutional kernel of the eighth convolutional layer may be 16×8×3×3, and the convolutional kernel of the ninth convolutional layer may be 2×16×3×3; and, the fifth convolutional layer, the sixth convolutional layer, the seventh convolutional layer, the eighth convolutional layer, the ninth convolutional layer and the tenth convolutional layer all have a stride of 1.

In an embodiment of the present disclosure, the convolutional operation of the convolutional structure may be defined as:

$$y_{d,i,j} = \sum_c \sum_h \sum_w W_{d,c,h,w} X_{c,i \times s_1 + h, j \times s_2 + w} + b_d;$$

where $y_{d,i,j}$ refers to the (d,i,j)-th element output by the convolutional structure, d refers to an output channel number, i refers to the row number of $y_{d,i,j}$ in the reconstructed CSI matrix, j refers to the column number of $y_{d,i,j}$ in the reconstructed CSI matrix, $W_{d,c,h,w}$ refers to the (d, c, h, w)-th element in a convolutional kernel weight matrix W, c refers to an input channel number, h refers to a length of the convolutional kernel, w refers to a width of the convolutional kernel, $b_d$ refers to the d-th element in the convolutional kernel offset b, $X_{c,i \times s_1 + h, j \times s_2 + w}$ is the (c, i λ $s_1$+h, j λ $s_2$+W)-th element convolutionally input, i is a row number of $X_{c,i \times s_1 + h, j \times s_2 + w}$ in the preparatory CSI matrix, j is a column number of $X_{c,i \times s_1 + h, j \times s_2 + w}$ in the preparatory CSI matrix, $s_1$ and $s_2$ are convolutional strides denoted as $(s_1, s_2)$, where $s_1$ is a transverse movement stride of the convolutional kernel, and $s_2$ is a longitudinal movement stride of the convolutional kernel. The activation function of each convolutional layer is a Leakyrelu function defined as below:

$$Leakyrelu(x) = \left\{ \begin{matrix} x & x \geq 0 \\ 0.3x & x < 0 \end{matrix} \right\}.$$

Furthermore, in an embodiment of the present disclosure, the reconstructed CSI matrix specifically includes a reconstructed CSI matrix corresponding to a real part of the CSI matrix and a reconstructed CSI matrix corresponding to an imaginary part of the CSI matrix. After the reconstructed CSI matrix corresponding to the real part of the CSI matrix and the reconstructed CSI matrix corresponding to the imaginary part of the CSI matrix are determined, the reconstructed CSI matrix corresponding to the real part of the CSI matrix and the reconstructed CSI matrix corresponding to the imaginary part of the CSI matrix may be combined to form a complex matrix, and then two-dimensional discrete Fourier inverse transform is performed on the complex matrix to obtain a CSI matrix of space-frequency domain.

In conclusion, in the information feedback methods provided by the embodiments of the present disclosure, the UE screens the elements in the CSI matrix to obtain a sparse CSI matrix. Specifically, when determining the sparse CSI matrix, the UE may firstly perform image division on a CSI image information matrix corresponding to the CSI matrix to obtain a plurality of sub-image information matrices. Then, based on each sub-image information matrix and a neighboring sub-image information matrix, determine a distribution function corresponding to each sub-image information matrix, and then based on the distribution function, determine self-information corresponding to each sub-image information matrix. Finally, based on the self-information, screen redundant information to determine the sparse CSI matrix. Furthermore, the UE may determine feedback information based on the elements in the sparse CSI matrix and send the feedback information to the base station, such that the base station reconstructs a CSI matrix based on the feedback information.

It can be known that, in the embodiments of the present disclosure, when the distribution function is determined, structural relevance between each sub-image information matrix and neighboring sub-image information matrices is considered. In this case, when the sparse CSI matrix is determined based on the distribution function subsequently, the structure of the original CSI matrix will not be destroyed and thus, when the base station subsequently determines the feedback information based on the sparse CSI matrix to reconstruct a CSI matrix, the accuracy of the reconstructed CSI matrix can be guaranteed.

Furthermore, since the sparse CSI matrix in the embodiments of the present disclosure is a matrix obtained by deleting redundant information, the convenience of subsequent operation for the sparse CSI matrix is guaranteed, and the overhead is reduced.

Furthermore, the feedback information determined by the UE in the embodiments of the present disclosure includes position information of compressed elements in the sparse CSI matrix. Subsequently, the base station can accurately reconstruct a CSI matrix based on the position information of the compressed elements in the sparse CSI matrix, further ensuring the reconstruction accuracy of the CSI matrix.

Figure 6:
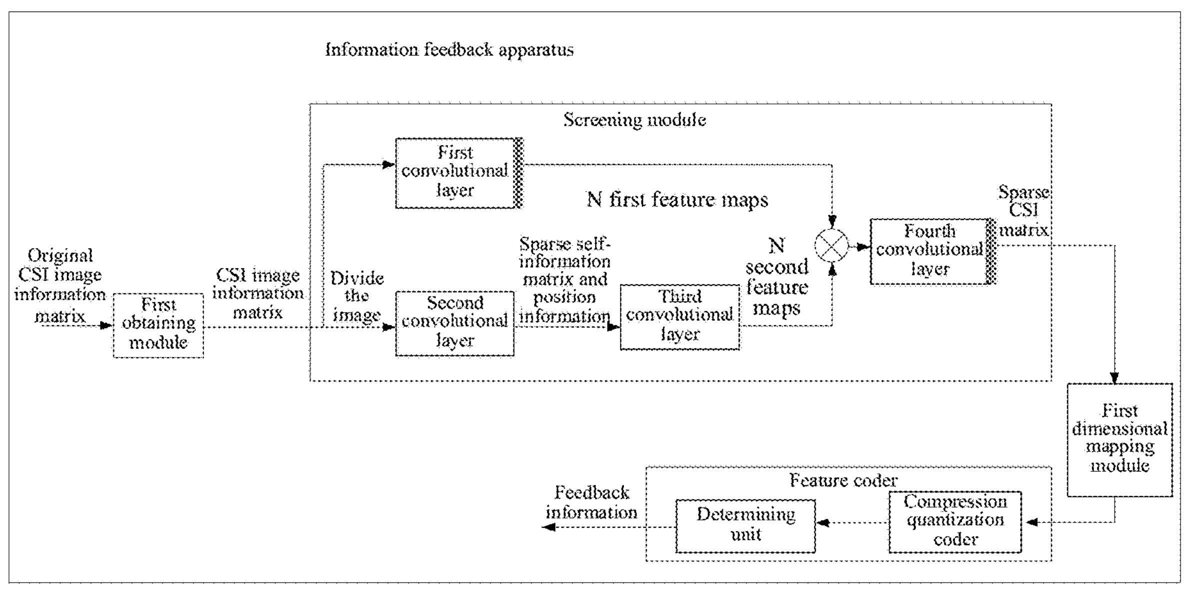
FIG. 6 is a structural schematic diagram illustrating an information feedback apparatus according to an embodiment of the present disclosure.

FIG. 6 is a structural schematic diagram illustrating an information feedback apparatus according to an embodiment of the present disclosure. The apparatus is applied to a User Equipment (UE). As shown in FIG. 6, the information feedback apparatus includes a first obtaining module, a screening module, and a feature coder.

The first obtaining module is configured to obtain a Channel State Information (CSI) matrix.

The screening module is configured to, based on self-information of the CSI matrix, screen elements in the CSI matrix to obtain a sparse CSI matrix.

The feature coder, configured to, based on the elements in the sparse CSI matrix, determine feedback information and send the feedback information to a base station.

In conclusion, in the information feedback apparatus provided by the embodiments of the present disclosure, the UE screens the elements in the CSI matrix to obtain a sparse CSI matrix. Specifically, when determining the sparse CSI matrix, the UE may firstly perform image division on a CSI image information matrix corresponding to the CSI matrix to obtain a plurality of sub-image information matrices. Based on each sub-image information matrix and a neighboring sub-image information matrix, a distribution function corresponding to each sub-image information matrix is determined, and then based on the distribution function, self-information corresponding to each sub-image information matrix is determined. Finally, based on the self-information, redundant information is screened to determine the sparse CSI matrix. Furthermore, the UE may determine feedback information based on the elements in the sparse CSI matrix and send the feedback information to the base station, such that the base station reconstructs a CSI matrix based on the feedback information.

It can be known that, in the embodiments of the present disclosure, when the distribution function is determined, structural relevance between each sub-image information matrix and neighboring sub-image information matrices is considered. In this case, when the sparse CSI matrix is determined based on the distribution function subsequently, the structure of the original CSI matrix will not be destroyed and thus, when the base station subsequently determines the feedback information based on the sparse CSI matrix to reconstruct a CSI matrix, the accuracy of the reconstructed CSI matrix can be guaranteed.

Furthermore, since the sparse CSI matrix in the embodiments of the present disclosure is a matrix obtained by deleting redundant information, the convenience of subsequent operation for the sparse CSI matrix is guaranteed, and the overhead is reduced.

Furthermore, the feedback information determined by the UE in the embodiments of the present disclosure includes position information of compressed elements in the sparse CSI matrix and subsequently, the base station can accurately reconstruct a CSI matrix based on the position information of the compressed elements in the sparse CSI matrix, further ensuring the reconstruction accuracy of the CSI matrix.

In an embodiment, in an embodiment of the present disclosure, the first obtaining module is further configured to: transform the obtained CSI matrix from a space-frequency domain to an angle delay domain, where the CSI matrix includes a real part and an imaginary part.

In an embodiment, in another embodiment of the present disclosure, the screening module is further configured to:

map the CSI matrix into a CSI image information matrix;

perform feature processing on the CSI image information matrix by using a first convolutional layer to obtain n first feature maps, where n is a integer and n≥1;

determine a self-information matrix corresponding to the CSI image information matrix by using a second convolutional layer, where the self-information matrix and the CSI image information matrix are same in size;

replace the elements with an element value less than a preset threshold in the self-information matrix with 0 to obtain a sparse self-information matrix, and determine position information of non-0 elements of the sparse self-information matrix in the sparse self-information matrix;

perform feature processing on the sparse self-information matrix by using a third convolutional layer to obtain n second feature maps; and based on the n first feature maps and the n second feature maps, determine, by using a fourth convolutional layer, the sparse CSI matrix and position information of non-0 elements in the sparse CSI matrix.

In an embodiment, in another embodiment of the present disclosure, the screening module is further configured to:

add 0 around the CSI image information matrix to expand the CSI image information matrix to obtain an expanded CSI image information matrix, and divide the expanded CSI image information matrix into m sub-image matrices; where m is an integer, m≥2, and m is equal to the number of the elements included in the CSI image information matrix; and for each of the m sub-image matrices, based on the sub-image matrix and neighboring sub-image matrices of the sub-image matrix, calculate, by using the second convolutional layer, a distribution function of the sub-image matrix, and based on the distribution function, calculate the self-information of each sub-image matrix, and then based on the self-information of the sub-image matrix, form the self-information matrix.

In an embodiment, in another embodiment of the present disclosure, the screening module is further configured to:

select an i-th sub-image matrix $p_i$ input to the second convolutional layer, where i is an integer and i≥1;

determine neighboring sub-image matrices $p_i'$ of the $p_i$ to obtain a neighboring sub-image set $Z_i$ corresponding to the $p_i$; where the neighboring sub-image set $Z_i$ includes $(2R+1)^2$ neighboring sub-image matrices $p_i'$ within a circle with the $p_i$ as center and Manhattan radius R as radius; and based on the formula I, determine the distribution function $f_i(p_i)$ of the $p_i$, where the formula I includes:

$$f_i(p_i) = \frac{1}{(2R+1)^2}\sum\nolimits_{p_i' \in Z_i} K(p_i, p_i');$$

wherein $$K(p_i, p_i') = \frac{1}{\sqrt{2\pi}\,h}\exp\left(-\|p_i - p_i'\|^2/2h^2\right),$$

and h represents a bandwidth between $p_i$ and $p_i'$.

In an embodiment, in another embodiment of the present disclosure, the screening module is further configured to:

based on the distribution function $f_i(p_i)$ of the i-th sub-image matrix, by using the formula II, calculate the self-information $I_i(p_i)$ of the i-th sub-image matrix, where the formula II includes:

$$I_i(p_i) = -\log(f_i(p_i)).$$

In an embodiment, in another embodiment of the present disclosure, the screening module is further configured to:

establish one first empty matrix, where the first empty matrices and the CSI image information matrix are same in size; and based on a position of each of the m sub-image matrices in the expanded CSI image information matrix, fill the self-information corresponding to each sub-image matrix into the first empty matrix to form the self-information matrix.

In an embodiment, in another embodiment of the present disclosure, the first convolutional layer and the fourth convolutional layer both are convolutional layers with gradient update.

In an embodiment, in another embodiment of the present disclosure, the apparatus is further configured to train the first convolutional layer and the fourth convolutional layer.

In an embodiment, in another embodiment of the present disclosure, the feature coder further includes a compression quantization coder and a determining unit.

The compression quantization coder is configured to perform compression quantization on the elements in the sparse CSI matrix to obtain compressed code words.

The determining unit is configured to determine the position information of the compressed elements in the sparse CSI matrix and determine the compressed code words and the position information as the feedback information.

In another embodiment of the present disclosure, the apparatus further includes: a first dimensional mapping module connected between the screening module and the feature coder to, when the dimensional of the sparse CSI matrix output by the screening module is not applicable to the dimension of the feature coder, map the dimension of the sparse CSI matrix output by the screening module into a dimension applicable to the feature coder.

Figure 7:
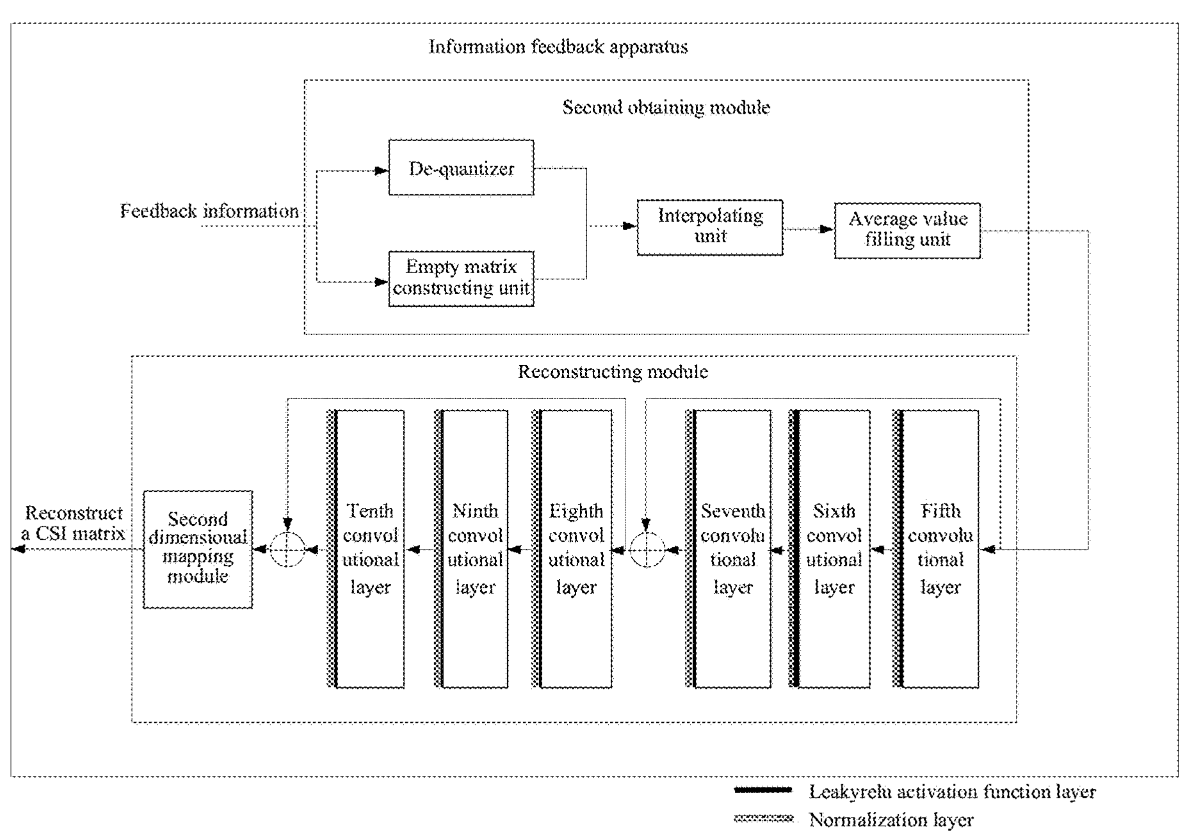
FIG. 7 is a structural schematic diagram illustrating an information feedback apparatus according to an embodiment of the present disclosure.

FIG. 7 is a structural schematic diagram illustrating an information feedback apparatus according to an embodiment of the present disclosure. The apparatus is applied to a base station. A shown in FIG. 7, the information feedback apparatus includes a second obtaining module and a reconstructing module.

The second obtaining module is configured to obtain feedback information from a user equipment (UE) and based on the feedback information, determine a preparatory CSI matrix;

The reconstructing module is configured to, based on the preparatory CSI matrix, reconstruct a CSI matrix.

In conclusion, in the information feedback apparatus provided by the embodiments of the present disclosure, the UE screens the elements in the CSI matrix to obtain a sparse CSI matrix. Specifically, when determining the sparse CSI matrix, the UE may firstly perform image division on a CSI image information matrix corresponding to the CSI matrix to obtain a plurality of sub-image information matrices, and then, based on each sub-image information matrix and a neighboring sub-image information matrix, determine a distribution function corresponding to each sub-image information matrix, and then based on the distribution function, determine self-information corresponding to each sub-image information matrix, and finally, based on the self-information, screen redundant information to determine the sparse CSI matrix. Furthermore, the UE may determine feedback information based on the elements in the sparse CSI matrix and send the feedback information to the base station, such that the base station reconstructs a CSI matrix based on the feedback information.

It can be known that, in the embodiments of the present disclosure, when the distribution function is determined, structural relevance between each sub-image information matrix and neighboring sub-image information matrices is considered. In this case, when the sparse CSI matrix is determined based on the distribution function subsequently, the structure of the original CSI matrix will not be destroyed and thus, when the base station subsequently determines the feedback information based on the sparse CSI matrix to reconstruct a CSI matrix, the accuracy of the reconstructed CSI matrix can be guaranteed.

Furthermore, since the sparse CSI matrix in the embodiments of the present disclosure is a matrix obtained by deleting redundant information, the convenience of subsequent operation for the sparse CSI matrix is guaranteed, and the overhead is reduced.

Furthermore, the feedback information determined by the UE in the embodiments of the present disclosure includes position information of compressed elements in the sparse CSI matrix and subsequently, the base station can accurately reconstruct a CSI matrix based on the position information of the compressed elements in the sparse CSI matrix, further ensuring the reconstruction accuracy of the CSI matrix.

In an embodiment, in an embodiment of the present disclosure, the feedback information includes: compressed code words obtained by performing compression quantization on the elements in the sparse CSI matrix corresponding to the CSI matrix and the position information of the compressed elements in the sparse CSI matrix.

The second obtaining module further includes: a de-quantizer, an empty matrix constructing unit, an interpolating unit, and an average value filling unit.

The de-quantizer is configured to perform de-quantization on the compressed code words to obtain de-quantized code words;

The empty matrix constructing unit is configured to construct one second empty matrix, where the second empty matrix and the CSI matrix are same in size;

The interpolating unit is configured to, based on the position information, fill the de-quantized code words into the second empty matrix.

The average value filling unit is configured to calculate average values of the de-quantized code words and fill the average values into other positions of the second empty matrix to obtain a preparatory CSI matrix.

In an embodiment of the present disclosure, the reconstructing module is further configured to:

by using a pre-trained convolutional structure, obtain the preparatory CSI matrix to output the CSI matrix.

In an embodiment of the present disclosure, the convolutional structure includes a fifth convolutional layer, a sixth convolutional layer, a seventh convolutional layer, an eighth convolutional layer, a ninth convolutional layer, and a tenth convolutional layer which are sequentially connected; where an output end of the fifth convolutional layer is further connected to an input end of the eighth convolutional layer, and an output end of the eighth convolutional layer is further connected to an input end of the tenth convolutional layer.

In an embodiment of the present disclosure, the apparatus is further configured to train the convolutional structure.

In an embodiment of the present disclosure, the reconstructing module further includes: a second dimensional mapping module connected with an output end of the tenth convolutional layer to map a dimension of the matrix output by the tenth convolutional layer into a dimension of the original CSI matrix.

In an embodiment of the present disclosure, the reconstructed CSI matrix specifically includes a reconstructed CSI matrix corresponding to a real part of the CSI matrix and a reconstructed CSI matrix corresponding to an imaginary part of the CSI matrix.

The reconstructing module is further configured to combine the reconstructed CSI matrix corresponding to the real part of the CSI matrix and the reconstructed CSI matrix corresponding to the imaginary part of the CSI matrix to form a complex matrix, and then perform two-dimensional discrete Fourier inverse transform on the complex matrix to obtain a CSI matrix of space-frequency domain.

Figure 8:
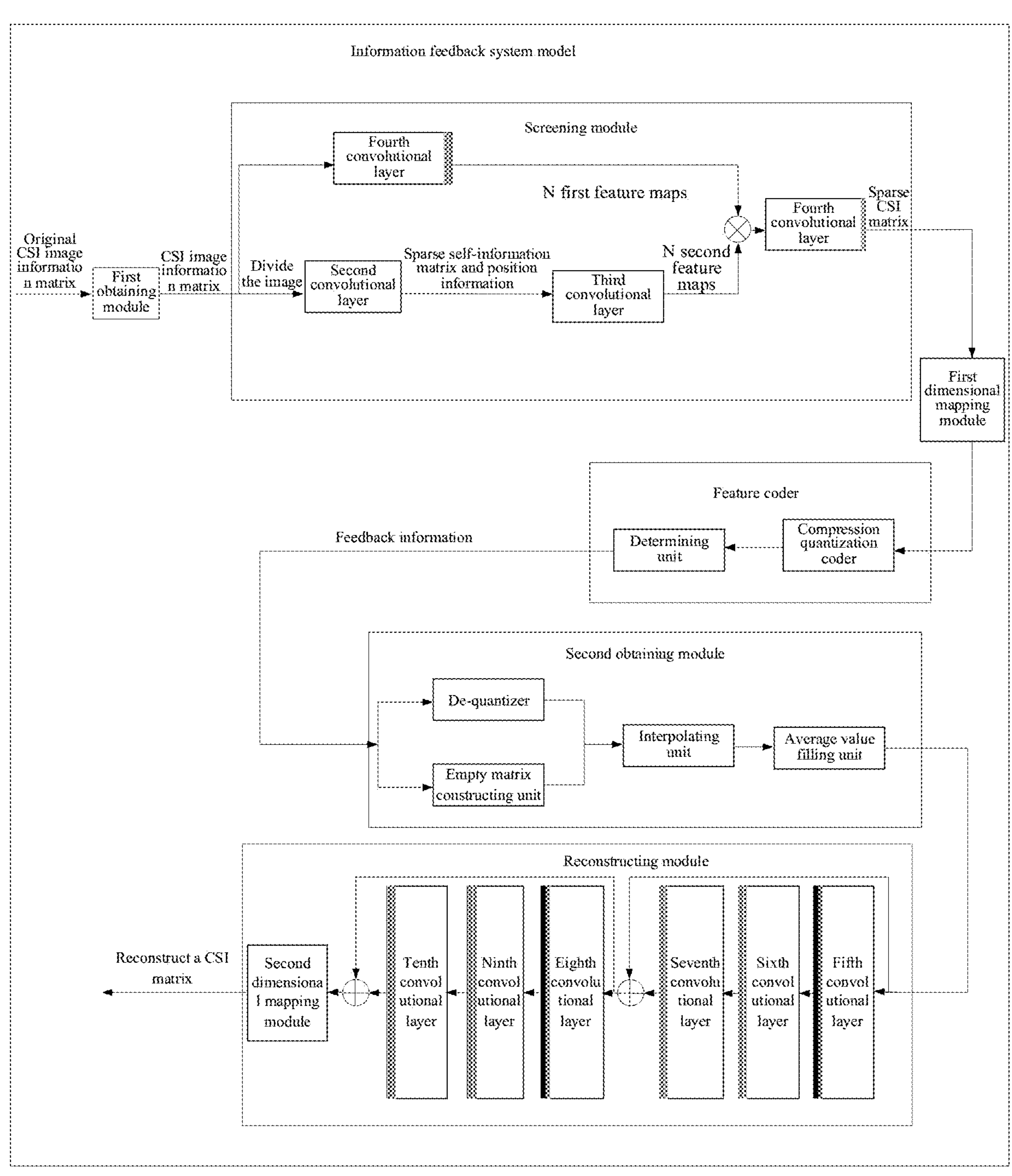
FIG. 8 is a structural schematic diagram illustrating an information feedback system model according to an embodiment of the present disclosure.

Furthermore, FIG. 8 is a structural schematic diagram illustrating an information feedback system model according to an embodiment of the present disclosure. As shown in FIG. 8. The model includes a first obtaining module, a screening module, a first dimensional mapping module, a feature coder, a second obtaining module, and a reconstructing module which are sequentially connected, where the detailed descriptions of the first obtaining module, the screening module, the first dimensional mapping module, the feature coder, the second obtaining module, and the reconstructing module can be referred to the above descriptions and will not be repeated herein.

In conclusion, in the information feedback system model provided by the embodiments of the present disclosure, the UE screens the elements in the CSI matrix to obtain a sparse CSI matrix. Specifically, when determining the sparse CSI matrix, the UE may firstly perform image division on a CSI image information matrix corresponding to the CSI matrix to obtain a plurality of sub-image information matrices, and then, based on each sub-image information matrix and a neighboring sub-image information matrix, determine a distribution function corresponding to each sub-image information matrix, and then based on the distribution function, determine self-information corresponding to each sub-image information matrix, and finally, based on the self-information, screen redundant information to determine the sparse CSI matrix. Furthermore, the UE may determine feedback information based on the elements in the sparse CSI matrix and send the feedback information to the base station, such that the base station reconstructs a CSI matrix based on the feedback information.

It can be known that, in the embodiments of the present disclosure, when the distribution function is determined, structural relevance between each sub-image information matrix and neighboring sub-image information matrices is considered. In this case, when the sparse CSI matrix is determined based on the distribution function subsequently, the structure of the original CSI matrix will not be destroyed and thus, when the base station subsequently determines the feedback information based on the sparse CSI matrix to reconstruct a CSI matrix, the accuracy of the reconstructed CSI matrix can be guaranteed.

Furthermore, since the sparse CSI matrix in the embodiments of the present disclosure is a matrix obtained by deleting redundant information, the convenience of subsequent operation for the sparse CSI matrix is guaranteed, and the overhead is reduced.

Furthermore, the feedback information determined by the UE in the embodiments of the present disclosure includes position information of compressed elements in the sparse CSI matrix and subsequently, the base station can accurately reconstruct a CSI matrix based on the position information of the compressed elements in the sparse CSI matrix, further ensuring the reconstruction accuracy of the CSI matrix.

Furthermore, in an embodiment of the present disclosure, the information feedback system model shown in FIG. 8 may be trained, which includes the following steps I to III.

At step I, a CSI matrix sample set is firstly obtained, wherein the CSI matrix sample set may include training samples, verification samples and test samples.

Illustratively, in an embodiment of the present disclosure, a COST2100[7] channel model may be used to generate 150000 CSI matrix samples of space-frequency domain in a 5.3 GHZ indoor microcell scenario, where there may 100000 training samples, 30000 verification samples and 20000 test samples. In an embodiment of the present disclosure, when the information feedback system model is trained, epoch=1000, an optimizer is an Adam optimizer, learning rate=0.001, and batch=200.

At step II, based on the CSI matrix sample set, the information feedback system model is trained by using the method shown in FIGS. 1 to 5 to calculate a loss function L.

In an embodiment of the present disclosure, the loss function L may be defined below:

$$L = \frac{1}{N}\sum_{i=1}^{N}\|\hat{H}_a - H_a\|;$$

where N is a number of training samples, $\hat{H}_a$ refers to the reconstructed CSI matrix output by the reconstructing module provided on the base station, $\hat{H}_a$ refers to the original CSI matrix obtained by the first obtaining module provided on the UE, and ||•|| refers to Euclidean norm.

At step III, based on the loss function, a parameter of the information feedback system model is updated.

In an embodiment of the present disclosure, the parameter of the information feedback system model may include a weight and an offset of each convolutional layer.

The above steps 1 to 3 are repeated until the loss function converges, and thus training is determined as completed.

In conclusion, since the information feedback system model is trained by using the method shown in FIGS. 1 to 5 in the embodiments of the present disclosure and the redundant information of the matrices in the method shown in FIGS. 1 to 5 is small, the overhead is small and thus the method of training the information feedback system model is also low in complexity and fast in convergence, improving the accuracy and efficiency of the training method.

Furthermore, as shown in FIG. 8, in the reconstructing module, the output end of the fifth convolutional layer is further connected to the input end of the eighth convolutional layer, and the output end of the eighth convolutional layer is further connected to the input end of the tenth convolutional layer, so as to avoid gradient disappearance during the training of the reconstructing module, ensuring the training accuracy.

An embodiment of the present disclosure provides a non-transitory computer storage medium storing executable programs, where the executable programs are executed by a processor to perform the method of any one of FIGS. 1 to 4 and 5.

In order to carry out the above embodiments, the present disclosure further provides a computer program product including computer programs, where the computer programs are executed by a processor to perform the method of any one of FIGS. 1 to 4 and 5.

Furthermore, in order to carry out the above embodiments, the present disclosure further provides computer programs, where the computer programs are executed by a processor to perform the method of any one of FIGS. 1 to 4 and 5.

Figure 9:
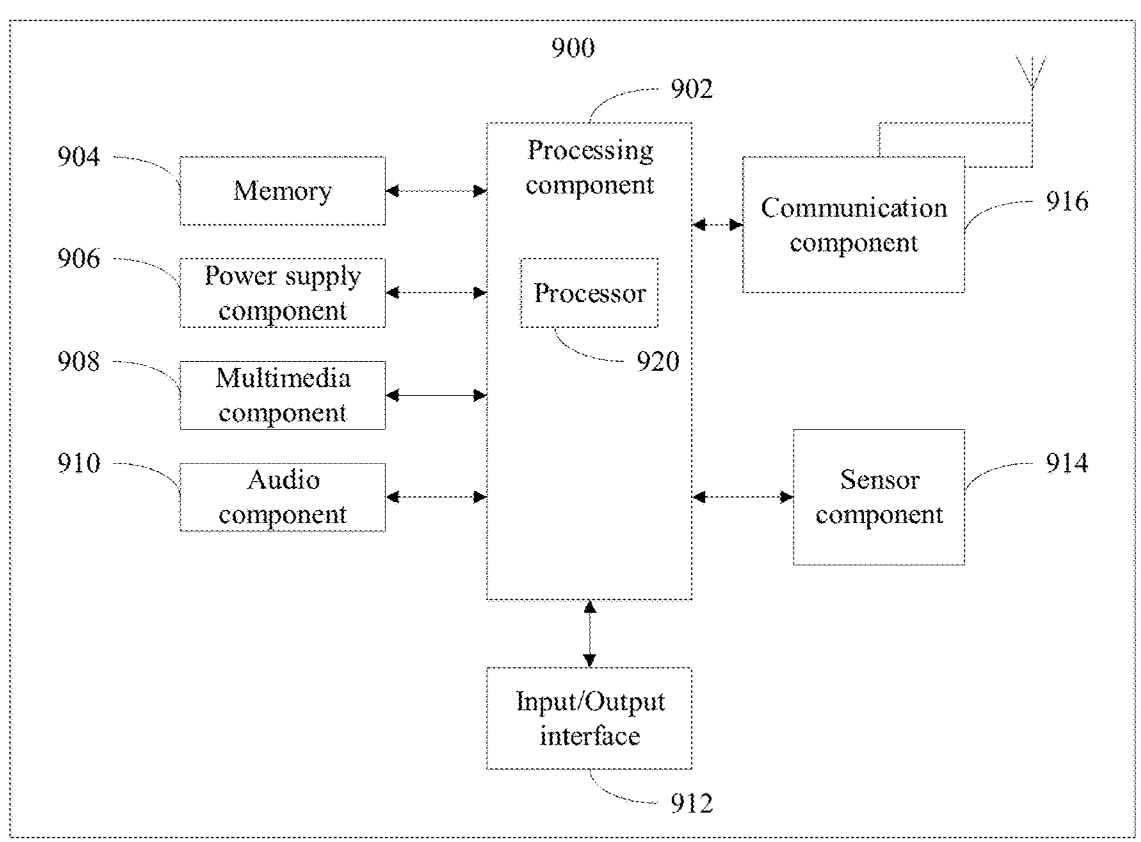
FIG. 9 is a block diagram illustrating a user equipment according to an embodiment of the present disclosure.

FIG. 9 is a block diagram of a User Equipment (UE) 900 according to an embodiment of the present disclosure. For example, the UE 900 may be a mobile phone, a computer, a digital broadcast terminal, a message transceiver, a game console, a tablet device, a medical device, a fitness device, a personal digital assistant, and the like.

As shown in FIG. 9, the UE 900 may include one or more of a processing component 902, a memory 904, a power supply component 906, a multimedia component 908, an audio component 910, an input/output (I/O) interface 912, a sensor component 914 and a communication component 916.

The processing component 902 generally controls overall operations of the UE 900, such as operations associated with display, phone calls, data communications, camera operations, and recording operations. The processing component 902 may include one or more processors 920 to execute instructions to complete all or part of the steps of the above methods. In addition, the processing component 902 may include one or more modules which facilitate the interaction between the processing component 902 and other components. For example, the processing component 902 may include a multimedia module to facilitate the interaction between the multimedia component 908 and the processing component 902.

The memory 904 is configured to store various types of data to support the operation of the UE 900. Examples of such data include instructions for any application or method operated on the UE 900, contact data, phonebook data, messages, pictures, videos, and so on. The memory 904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or compact disk.

The power supply component 906 supplies power for different components of the UE 900. The power supply component 906 may include a power supply management system, one or more power supplies, and other components associated with generating, managing and distributing power for the UE 900.

The multimedia component 908 includes a screen that provides an output interface between the UE 900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 908 includes a front camera and/or a rear camera. When the UE 900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 910 is configured to output and/or input audio signals. For example, the audio component 910 includes a microphone (MIC) configured to receive an external audio signal when the UE 900 is in an operation mode, such as a call mode, a recording mode, and a voice recognition mode. The received audio signal may be further stored in the memory 904 or transmitted via the communication component 916. In some examples, the audio component 910 also includes a loudspeaker for outputting an audio signal.

The I/O interface 912 provides an interface between the processing component 902 and a peripheral interface module which may be a keyboard, a click wheel, a button, or the like. These buttons may include, but are not limited to a home button, a volume button, a start button, and a lock button.

The sensor component 914 includes one or more sensors for providing a status assessment in various aspects for the UE 900. For example, the sensor component 914 may detect an open/closed state of the UE 900, and the relative positioning of components, for example, the component is a display and a keypad of the UE 900. The sensor component 914 may also detect a change in position of the UE 900 or a component of the UE 900, the presence or absence of a user in contact with the UE 900, the orientation or acceleration/deceleration of the UE 900 and a change in temperature of the UE 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an acceleration sensor, a gyro sensor, a magnetic sensor, a pressure sensor, or a temperature sensor.

The communication component 916 is configured to facilitate wired or wireless communication between the UE 900 and other devices. The UE 900 may access a wireless network based on a communication standard, such as WiFi, 2G or 3G, or a combination thereof.

In an example, the communication component 916 receives broadcast signals or broadcast associated information from an external broadcast management system via a broadcast channel. In an example, the communication component 916 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an exemplary embodiment, the UE 900 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

Figure 10:
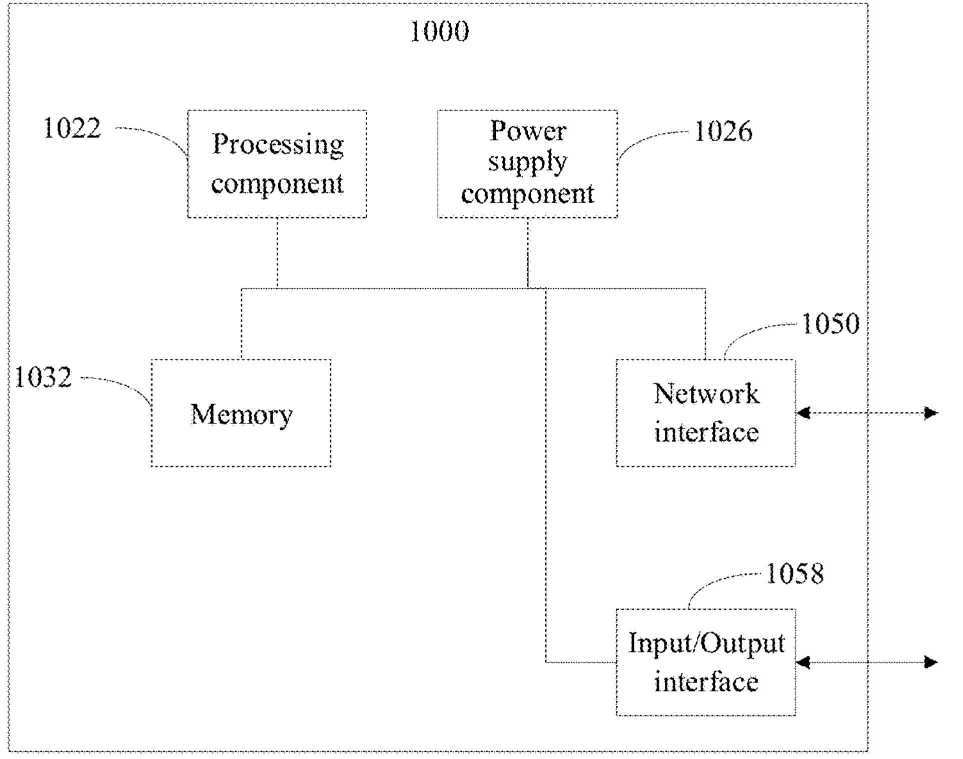
FIG. 10 is a block diagram illustrating a base station according to an embodiment of the present disclosure.

FIG. 10 is a block diagram of a base station 1000 according to an embodiment of the present disclosure. For example, the base station 1000 may be provided as a base station. As shown in FIG. 10, the base station 1000 may include a processing component 1022 which further includes one or more processors and memory resources represented by a memory 1032 for storing instructions executable by the processing component 1022, for example, an application program. The application program stored in the memory 1032 may include one or more modules, each of which corresponds to one set of instructions. Further, the processing component 1022 is configured to execute instructions to perform the above methods applied to the base station, for example, the method shown in FIG. 1.

The base station 1000 further includes a power supply component 1026 configured to execute power management for the base station 1000, a wired or wireless network interface 1050 configured to connect the base station 1000 to a network, and an input/output (I/O) interface 1058. The base station 1000 may be operated based on an operating system stored in the memory 1032, such as Windows Server™, Mac OS X™, Unix™, Linux™ and FreeBSD™.

In conclusion, in the information feedback methods provided by the embodiments of the present disclosure, the UE screens the elements in the CSI matrix to obtain a sparse CSI matrix. Specifically, when determining the sparse CSI matrix, the UE may firstly perform image division on a CSI image information matrix corresponding to the CSI matrix to obtain a plurality of sub-image information matrices, and then, based on each sub-image information matrix and a neighboring sub-image information matrix, determine a distribution function corresponding to each sub-image information matrix, and then based on the distribution function, determine self-information corresponding to each sub-image information matrix, and finally, based on the self-information, screen redundant information to determine the sparse CSI matrix. Furthermore, the UE may determine feedback information based on the elements in the sparse CSI matrix and send the feedback information to the base station, such that the base station reconstructs a CSI matrix based on the feedback information.

It can be known that, in the embodiments of the present disclosure, when the distribution function is determined, structural relevance between each sub-image information matrix and neighboring sub-image information matrices is considered. In this case, when the sparse CSI matrix is determined based on the distribution function subsequently, the structure of the original CSI matrix will not be destroyed and thus, when the base station subsequently determines the feedback information based on the sparse CSI matrix to reconstruct a CSI matrix, the accuracy of the reconstructed CSI matrix can be guaranteed.

Furthermore, since the sparse CSI matrix in the embodiments of the present disclosure is a matrix obtained by deleting redundant information, the convenience of subsequent operation for the sparse CSI matrix is guaranteed, and the overhead is reduced.

Furthermore, the feedback information determined by the UE in the embodiments of the present disclosure includes position information of compressed elements in the sparse CSI matrix and subsequently, the base station can accurately reconstruct a CSI matrix based on the position information of the compressed elements in the sparse CSI matrix, further ensuring the reconstruction accuracy of the CSI matrix.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An information feedback method, performed by a user equipment (UE) and comprising:

obtaining a channel state information (CSI) matrix;

screening, based on self-information of the CSI matrix, elements in the CSI matrix to obtain a sparse CSI matrix; and determining, based on elements in the sparse CSI matrix, feedback information and sending the feedback information to a base station;

wherein based on the self-information of the CSI matrix, screening the elements in the CSI matrix comprises:

mapping the CSI matrix into a CSI image information matrix;

performing feature processing on the CSI image information matrix by using a first convolutional layer to obtain n first feature maps, wherein n is a positive integer;

determining a self-information matrix corresponding to the CSI image information matrix by using a second convolutional layer, wherein the self-information matrix and the CSI image information matrix are same in size;

replacing elements with an element value less than a preset threshold in the self-information matrix with 0 to obtain a sparse self-information matrix, and determining position information of non-zero elements in the sparse self-information matrix;

performing feature processing on the sparse self-information matrix by using a third convolutional layer to obtain n second feature maps; and determining, based on the n first feature maps and the n second feature maps by using a fourth convolutional layer, the sparse CSI matrix and position information of non-zero elements in the sparse CSI matrix.

2. The method of claim 1, wherein obtaining the CSI matrix comprises:

transforming the CSI matrix from a space frequency domain to an angle delay domain, wherein the CSI matrix comprises a real part and an imaginary part.

3. The method of claim 1, wherein determining the self-information matrix corresponding to the CSI image information matrix by using the second convolutional layer comprises:

expanding the CSI image information matrix by adding 0 around the CSI image information matrix to obtain an expanded CSI image information matrix, and dividing the expanded CSI image information matrix into m sub-image matrices, wherein m is an integer, m is greater than or equal to two, and m is equal to a number of elements comprised in the CSI image information matrix;

calculating for each of the m sub-image matrices, based on a sub-image matrix and neighboring sub-image matrices of the sub-image matrix by using the second convolutional layer, a distribution function of the sub-image matrix, and calculating, based on the distribution function, self-information of the sub-image matrix; and forming, based on self-information of each of the m sub-image matrices, the self-information matrix.

4. The method of claim 3, wherein calculating for each of the m sub-image matrices, based on the sub-image matrix and the neighboring sub-image matrices of the sub-image matrix by using the second convolutional layer, the distribution function of the sub-image matrix comprises:

selecting an i-th sub-image matrix $p_i$ input to the second convolutional layer, wherein i is a positive integer;

determining neighboring sub-image matrices $p_i'$ of the i-th sub-image matrix $p_i$ to obtain a neighboring sub-image set $Z_i$ corresponding to the i-th sub-image matrix $p_i$, wherein the neighboring sub-image set $Z_i$ comprises $(2R+1)_2$ neighboring sub-image matrices $p_i'$ within a circle with the $p_i$ as center and Manhattan radius R as radius; and based on a formula I, determining a distribution function $f_i(p_i)$ of the $p_i$, wherein the formula I comprises:

$$f_i(p_i) = \frac{1}{(2R+1)^2} \sum\nolimits_{p_i' \in Z_i} K(p_i, p_i');$$

wherein $$K(p_i, p_i') = \frac{1}{\sqrt{2\pi}\, h} \exp\left(-\|p_i - p_i'\|^2 / 2h^2\right),$$

and h represents a bandwidth between $p_i$ and $p_i'$.

5. The method of claim 3, wherein calculating, based on the distribution function, the self-information of the sub-image matrix comprises:

based on the distribution function $f_i(p_i)$ of the i-th sub-image matrix, calculating, by using a formula II, a self-information $I_i(p_i)$ of the i-th sub-image matrix, wherein the formula II comprises:

$$I_i(p_i) = -\log(f_i(p_i)).$$

6. The method of claim 3, wherein forming, based on the self-information of each of the m sub-image matrices, the self-information matrix comprises:

establishing a first empty matrix, wherein the first empty matrix and the CSI image information matrix are same in size; and based on a position of each of the m sub-image matrix in the expanded CSI image information matrix, filling the self-information of each of the m sub-image matrix into the first empty matrix to form the self-information matrix.

7. The method of claim 1, wherein the first convolutional layer and the fourth convolutional layer both are convolutional layers with gradient update.

8. The method of claim 7, further comprising:

training the first convolutional layer and the fourth convolutional layer.

9. The method of claim 1, wherein determining the feedback information based on the elements in the sparse CSI matrix comprises:

performing compression quantization on the elements in the sparse CSI matrix to obtain compressed code words; and determining position information of the compressed elements in the sparse CSI matrix and determining the compressed code words and the position information as the feedback information.

10. The method of claim 9, wherein performing the compression quantization on the elements in the sparse CSI matrix to obtain the compressed code words comprises:

sorting element values in the sparse CSI matrix in a descending order based on the self-information;

selecting top M element values from the element values as the compressed code words, wherein one element value corresponds to one code word; and determining position information of each of the top M element values in the sparse CSI matrix as the position information of the compressed element values in the sparse CSI matrix.

11. The method of claim 10, wherein a method of determining the M comprises:

determining a compression ratio σ;

based on a formula III, calculating the code number M of the compressed code words, wherein the formula III comprises:

$$\sigma = \frac{a \times M + k \times M}{a \times 2 \times N_c \times N_t}$$

wherein a indicates a number of bits required for transmitting one code word, k indicates a number of bits required for transmitting a position information of one code word, $N_c$ indicates a number of antennas provided in the base station, and $N_t$ indicates a number of sub-carriers corresponding to each of the antennas.

12. An information feedback method, performed by a base station and comprising:

obtaining feedback information from a user equipment (UE) to determine, based on the feedback information, a preparatory channel state information (CSI) matrix; and reconstructing, based on the preparatory CSI matrix, a CSI matrix;

wherein the feedback information comprises compressed code words obtained by performing compression quantization on elements in a sparse CSI matrix corresponding to the CSI matrix and position information of the compressed elements in the sparse CSI matrix; and wherein determining, based on the feedback information, the preparatory CSI matrix comprises:

performing de-quantization on the compressed code words to obtain de-quantized code words;

constructing a second empty matrix, where the second empty matrix and the CSI matrix are same in size;

based on the position information, filling the de-quantized code words into the second empty matrix; and calculating average values of the de-quantized code words and filling the average values to other positions of the second empty matrix to obtain the preparatory CSI matrix.

13. The method of claim 12, wherein based on the preparatory CSI matrix, determining the CSI matrix comprises:

obtaining, by using a pre-trained convolutional structure, the preparatory CSI matrix to output the CSI matrix.

14. The method of claim 13, wherein the pre-trained convolutional structure comprises a fifth convolutional layer, a sixth convolutional layer, a seventh convolutional layer, an eighth convolutional layer, a ninth convolutional layer, and a tenth convolutional layer which are sequentially connected;

wherein an output end of the fifth convolutional layer is further connected to an input end of the eighth convolutional layer, and an output end of the eighth convolutional layer is further connected to an input end of the tenth convolutional layer.

15. The method of claim 13, further comprising: training a convolutional structure.

16. A user equipment, comprising a transceiver, a memory, and a processor connected to the transceiver and the memory, and configured to execute computer executable instructions stored on the memory to control reception and transmission of a wireless signal of the transceiver, and perform the method of claim 1.

17. A base station, comprising a transceiver; a memory; and a processor connected to the transceiver and the memory, and configured to execute computer executable instructions stored on the memory to control reception and transmission of a wireless signal of the transceiver, and perform the method of claim 12.

18. A non-transitory computer storage medium, storing computer executable instructions thereon, wherein the computer executable instructions, when executed by a processor, cause the processor to perform operations comprising:

obtaining a channel state information (CSI) matrix;

screening, based on self-information of the CSI matrix, elements in the CSI matrix to obtain a sparse CSI matrix; and determining, based on elements in the sparse CSI matrix, feedback information and sending the feedback information to a base station;

wherein based on the self-information of the CSI matrix, screening the elements in the CSI matrix comprises:

mapping the CSI matrix into a CSI image information matrix;

performing feature processing on the CSI image information matrix by using a first convolutional layer to obtain n first feature maps, wherein n is a positive integer;

determining a self-information matrix corresponding to the CSI image information matrix by using a second convolutional layer, wherein the self-information matrix and the CSI image information matrix are same in size;

replacing elements with an element value less than a preset threshold in the self-information matrix with 0 to obtain a sparse self-information matrix, and determining position information of non-zero elements in the sparse self-information matrix;

performing feature processing on the sparse self-information matrix by using a third convolutional layer to obtain n second feature maps; and determining, based on the n first feature maps and the n second feature maps by using a fourth convolutional layer, the sparse CSI matrix and position information of non-zero elements in the sparse CSI matrix.

* * * * *